Patented Feb. 13, 1945

2,369,475

UNITED STATES PATENT OFFICE 2,369,475

MANUFACTURE OF SODIUM BICARBONATE

Walter McGeorge, Kingston Hill, and Francis Highland Milner, Twickenham, England, assignors to MacLeans Limited, Brentford, Middlesex, England, a British company No Drawing. Application September 29, 1942, Serial No. 460,166. In Great Britain October 22, 1941

10 Claims. (Cl. 23—64)

This invention relates to the manufacture of sodium bicarbonate in a very fine state of division.

British Specification No. 532,301 describes a process for the preparation of sodium bicarbonate in a very fine state of division, comprising the steps of preparing an aqueous solution of sodium bicarbonate containing not less than 3 grams of sodium bicarbonate per 100 grams of water preferably at a raised temperature not exceeding 45° C. and admixing therewith from ½ to 3 times the volume of a water-soluble organic solvent such as alcohol, whereafter the precipitate is recovered.

The process of British Specification No. 532,301, however, involves the recovery of the alcohol or other water-soluble organic liquid employed from its admixture with water and this necessitates the provision of extra plant and expense in the manufacture.

It is an object of the present invention to provide an improved process for the manufacture of sodium bicarbonate in a very fine state of division, avoiding the dilution of the alcohol or the like with water and consequently avoiding the subsequent recovery by distillation of the alcohol or the like.

With this object in view the present invention provides a process for the manufacture of sodium bicarbonate in a very fine state of division wherein anhydrous sodium carbonate or sodium carbonate monohydrate is suspended in an organic liquid in which anhydrous sodium carbonate, sodium carbonate monohydrate and sodium bicarbonate are substantially insoluble and subjected to the action of carbon dioxide at atmospheric or increased pressure, the reaction being carried out in the presence of water, the temperature during the reaction being maintained below 40° C. The minimum quantity of water to be employed is approximately equivalent to one molecule of water per molecule of anhydrous sodium carbonate and preferably amounts greatly in excess of this quantity are avoided. Thus when using alcohol, the strength should be not less than 70% and preferably not less than 80%.

The anhydrous sodium carbonate or sodium carbonate monohydrate employed as the starting material is reduced by ordinary mechanical means to as fine a state as possible and the carbon dioxide employed may be obtained from any desired source, but for reasons of economy we prefer to use the carbon dioxide obtained as a by-product in the process described in British Specification No. 532,300.

The carbon dioxide may be passed into the suspension in a closed vessel under pressure with vigorous mechanical agitation, or it may be admixed with air and circulated vigorously through the suspension.

The sodium bicarbonate obtained according to the process of the present invention, after removal of the alcohol or other organic liquid by filtration, is dried preferably below 40° C. and is found to be in a very fine state of division, and it is similar to that produced by the process of British Specification No. 532,301. Any traces of sodium carbonate will be retained in the liquid phase but if desired the product may be washed with alcohol to ensure purity.

The purity of the sodium carbonate employed as starting material should be such as to ensure that the resulting sodium bicarbonate conforms to the standard of the British Pharmacopaeia.

The following example illustrates how the process of the invention may be carried into effect:

53 parts by weight of finely ground sodium carbonate (anhydrous B. P.) are suspended in 430 parts by weight of industrial alcohol to which 20 parts by weight of water have been added. The mixture is stirred vigorously and subjected to the action of carbon dioxide gas at a pressure of four inches of water. This gives, after filtration and drying, a 94% yield of sodium bicarbonate in a very fine state of division and substantially free from carbonate.

In the example, the quantity of water added may be increased up to 40 mls.

We claim:

1. A process for the manufacture of sodium bicarbonate in a very fine state of division comprising the steps of suspending a substance selected from the group comprising anhydrous sodium carbonate and sodium carbonate monohydrate in an organic liquid in which the said substance and sodium bicarbonate are substantially insoluble, subjecting the suspension to the action of carbon dioxide in the presence of water and at a pressure not less than atmosphere, and maintaining the temperature below 40° C. during the reaction.

2. A process for the manufacture of sodium bicarbonate in a very fine state of division comprising the steps of suspending a substance selected from the group comprising anhydrous sodium carbonate and sodium carbonate monohydrate in alcohol, subjecting the suspension to the action of carbon dioxide in the presence of water and at a pressure not less than atmospheric, and maintaining the temperature below 40° C. during the reaction.

3. A process for the manufacture of sodium bicarbonate in a very fine state of division comprising the steps of suspending a substance selected from the group comprising anhydrous sodium carbonate and sodium carbonate monohydrate in aqueous alcohol of a strength not less than 70%, subjecting the suspension to the action of carbon dioxide at a pressure not less than atmospheric, and maintaining the temperature below 40° C. during the reaction.

4. A process for the manufacture of sodium bicarbonate in a very fine state of division comprising the steps of suspending a substance selected from the group comprising anhydrous sodium carbonate and sodium carbonate monohydrate in an organic liquid in which the said substance and sodium bicarbonate are substantially insoluble, subjecting the suspension to the action of carbon dioxide in the presence of water and at a pressure not less than atmospheric until the sodium carbonate is complete converted maintaining the temperature below 40° C. during the reaction, separating the resulting sodium bicarbonate from the liquid by filtration, and drying the separated sodium bicarbonate at a temperature below 40° C.

5. A process for the manufacture of sodium bicarbonate in a very fine state of division comprising the steps of suspending a substance selected from the group comprising anhydrous sodium carbonate and sodium carbonate monohydrate in alcohol, subjecting the suspension to the action of carbon dioxide in the presence of water and at a pressure not less than atmospheric until the sodium carbonate is completely converted maintaining the temperature below 40° C. during the reaction, separating the resulting sodium bicarbonate from the liquid by filtration, and drying the separated sodium bicarbonate at a temperature below 40° C.

6. A process for the manufacture of sodium bicarbonate in a very fine state of division comprising the steps of suspending a substance selected from the group comprising anhydrous sodium carbonate and sodium carbonate monohydrate in aqueous alcohol of a strength not less than 70%, subjecting the suspension to the action of carbon dioxide at a pressure not less than atmospheric until the sodium carbonate is completely converted maintaining the temperature below 40° C. during the reaction, separating the resulting sodium bicarbonate from the liquid by filtration, and drying the separated sodium bicarbonate at a temperature below 40° C.

7. A process for the manufacture of sodium bicarbonate in a very fine state of division comprising the steps of suspending a substance selected from the group comprising anhydrous sodium carbonate and sodium carbonate monohydrate in an organic liquid in which the said substrate and sodium bicarbonate are substantially insoluble, subjecting the suspension to the action of carbon dioxide in the presence of water and at a pressure not less than atmospheric until the sodium carbonate is completely converted maintaining the temperature below 40° C. during the reaction, separating the resulting sodium bicarbonate from the liquid by filtration, washing the separated sodium bicarbonate with alcohol and drying the separated sodium bicarbonate at a temperature below 40° C.

8. A process for the manufacture of sodium bicarbonate in a very fine state of division comprising the steps of suspending a substance selected from the group comprising anhydrous sodium carbonate and sodium carbonate monohydrate in alcohol, subjecting the suspension to the action of carbon dioxide in the presence of water and at a pressure not less than atmospheric until the sodium carbonate is completely converted maintaining the temperature below 40° C. during the reaction, separating the resulting sodium bicarbonate from the liquid by filtration, washing the separated sodium bicarbonate with alcohol, and drying the separated sodium bicarbonate at a temperature below 40° C.

9. A process for the manufacture of sodium bicarbonate in a very fine state of division comprising the steps of suspending a substance selected from the group comprising anhydrous sodium carbonate and sodium carbonate monohydrate in aqueous alcohol of a strength not less than 70%, subjecting the suspension to the action of carbon dioxide at a pressure not less than atmospheric until the sodium carbonate is completely converted maintaining the temperature below 40° C. during the reaction, separating the resulting sodium bicarbonate from the liquid by filtration, washing the separated sodium bicarbonate with alcohol, and drying the separated sodium bicarbonate at a temperature below 40° C.

10. A process for the manufacture of sodium bicarbonate in a very fine state of division, comprising the steps of suspending 53 parts by weight of pharmaceutically pure anhydrous sodium carbonate in 450 parts by weight of aqueous alcohol consisting of 430 parts of industrial alcohol and 20 parts of water, subjecting the suspension to vigorous stirring and to the action of gaseous carbondioxide under pressure until the sodium carbonate is completely converted, filtering to separate the liquid from the solid phase, and drying the separated sodium bicarbonate.

WALTER McGEORGE.
FRANCIS HIGHLAND MILNER.